June 23, 1970  A. D. PAXTON ET AL  3,516,221
AUTOMATIC BAGGING MACHINE
Filed Oct. 7, 1968  11 Sheets-Sheet 5

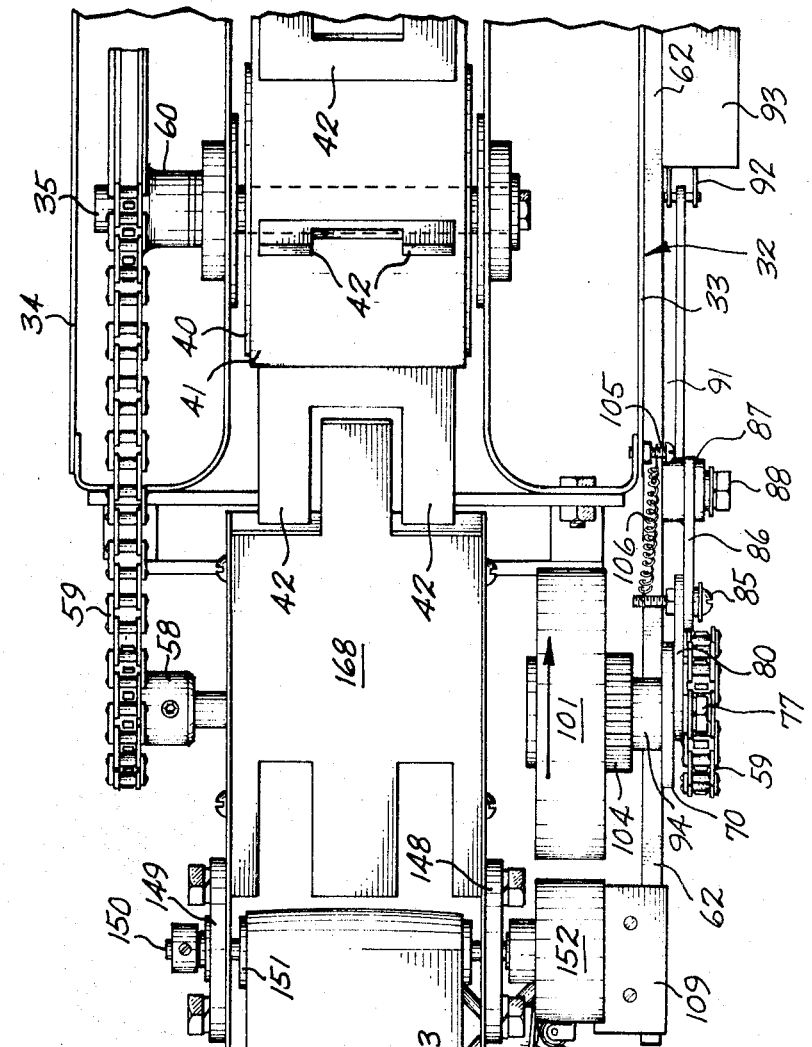

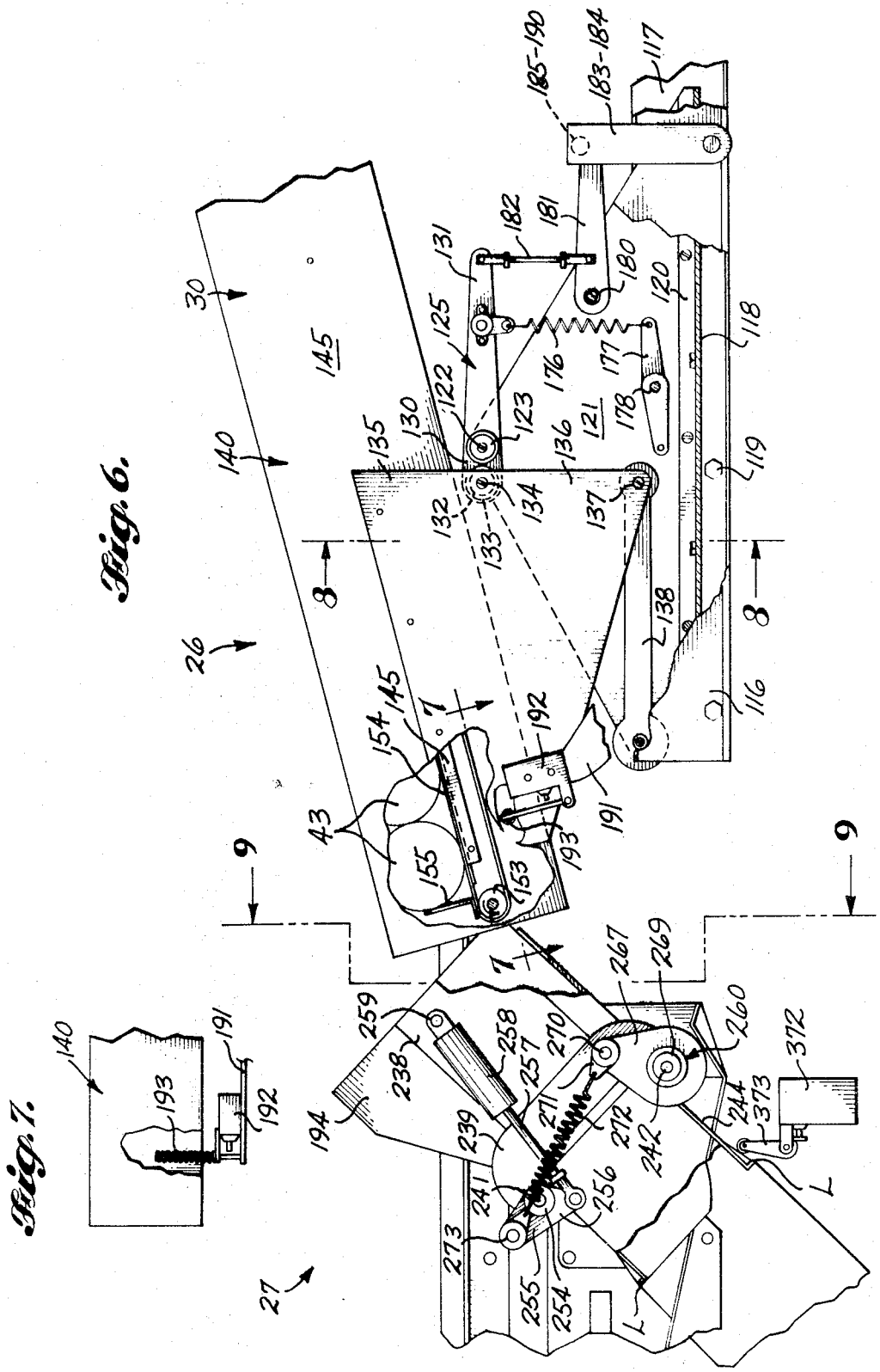

Fig. 10.

INVENTORS:
ALLEN D. PAXTON
STANLEY K. PAXTON
KENNETH P. PAXTON

BY

ATTORNEY

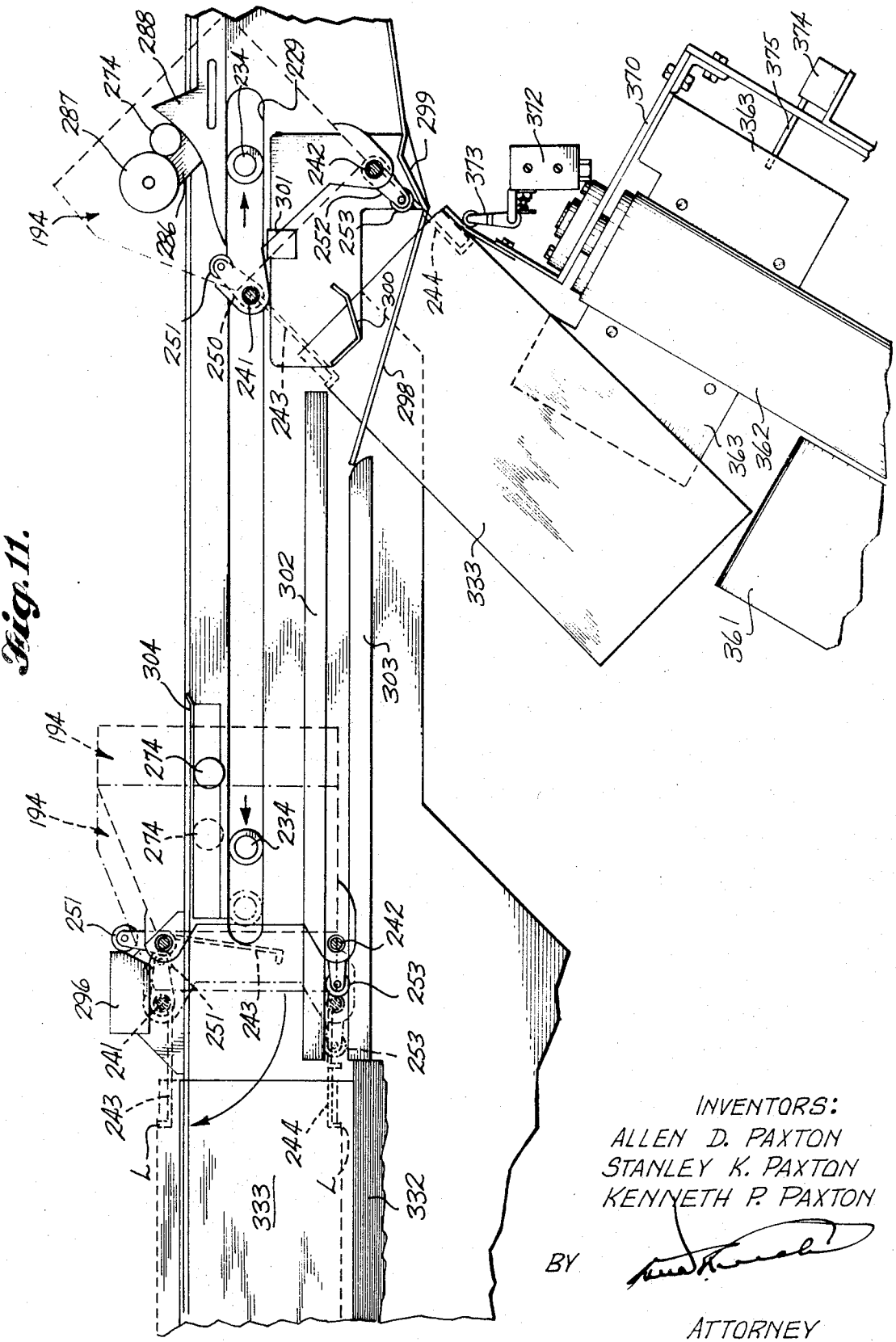

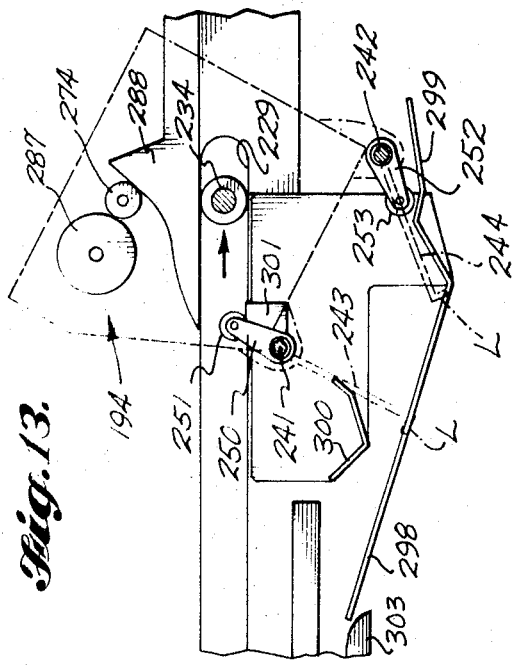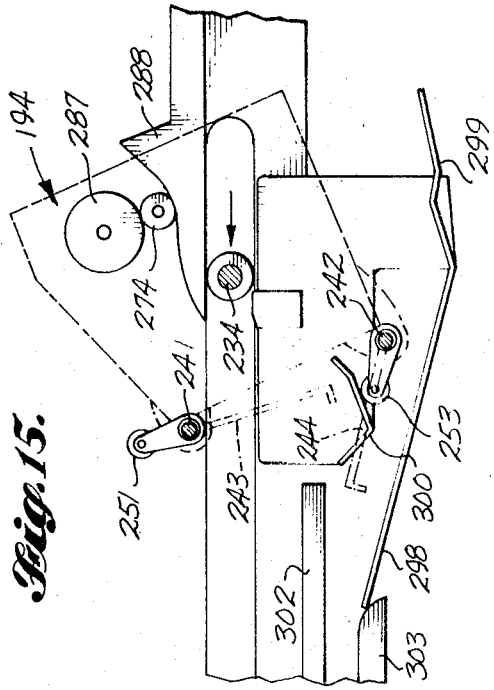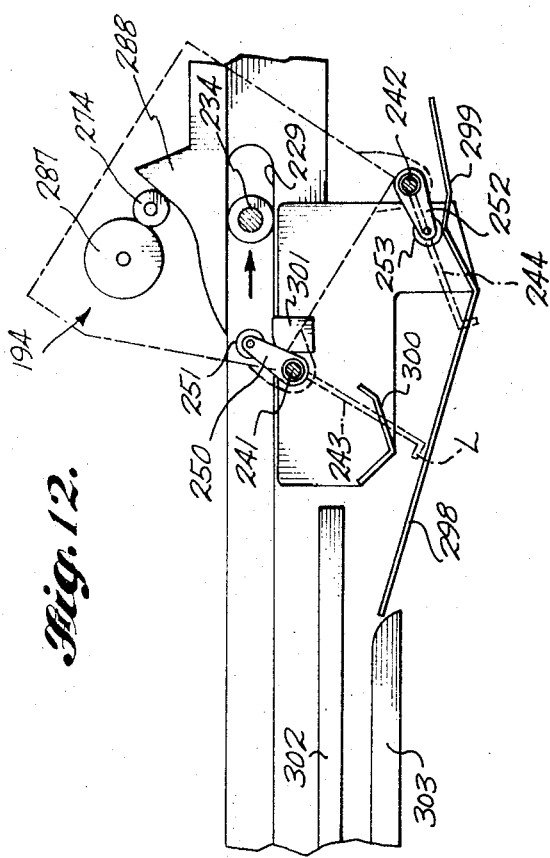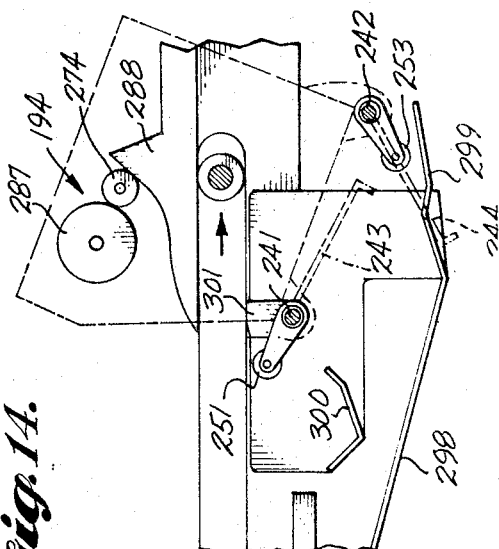
INVENTORS:
ALLEN D. PAXTON
STANLEY K. PAXTON
KENNETH P. PAXTON
BY
ATTORNEY

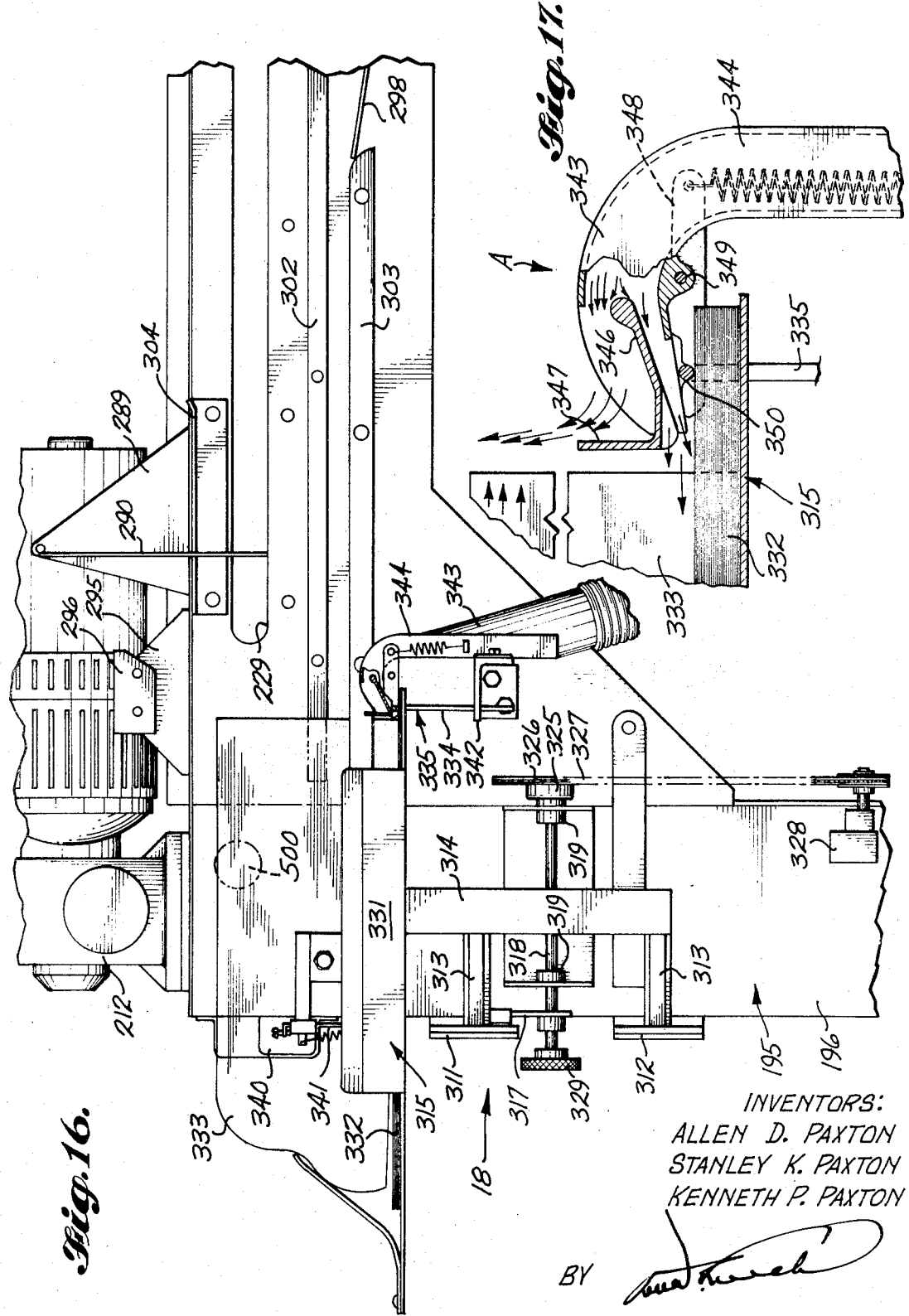

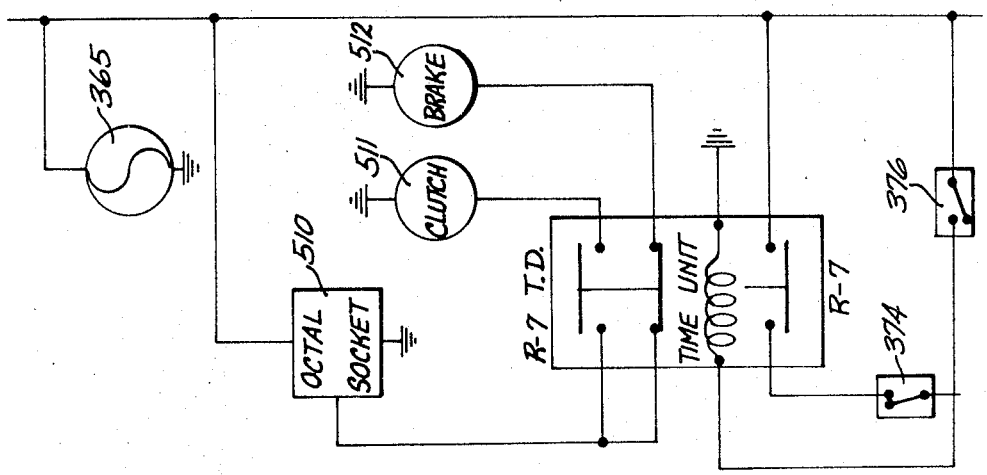
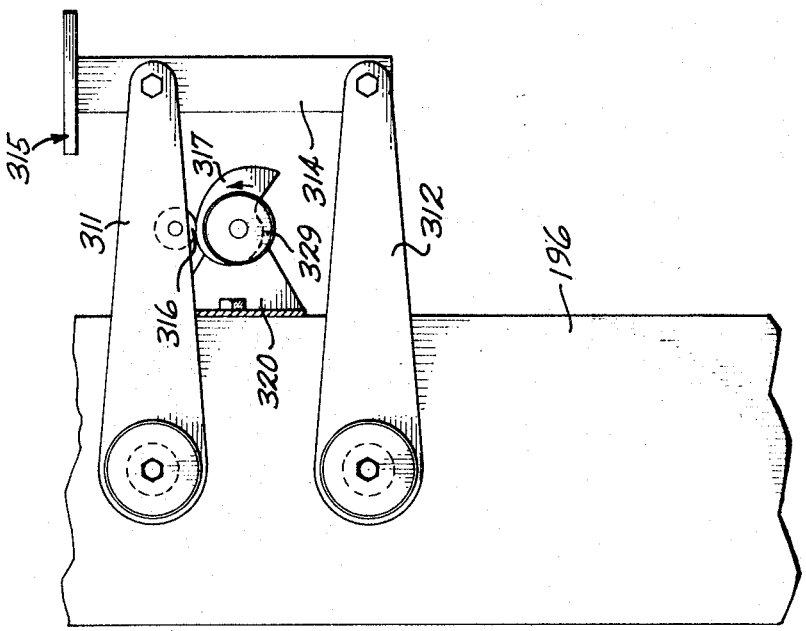

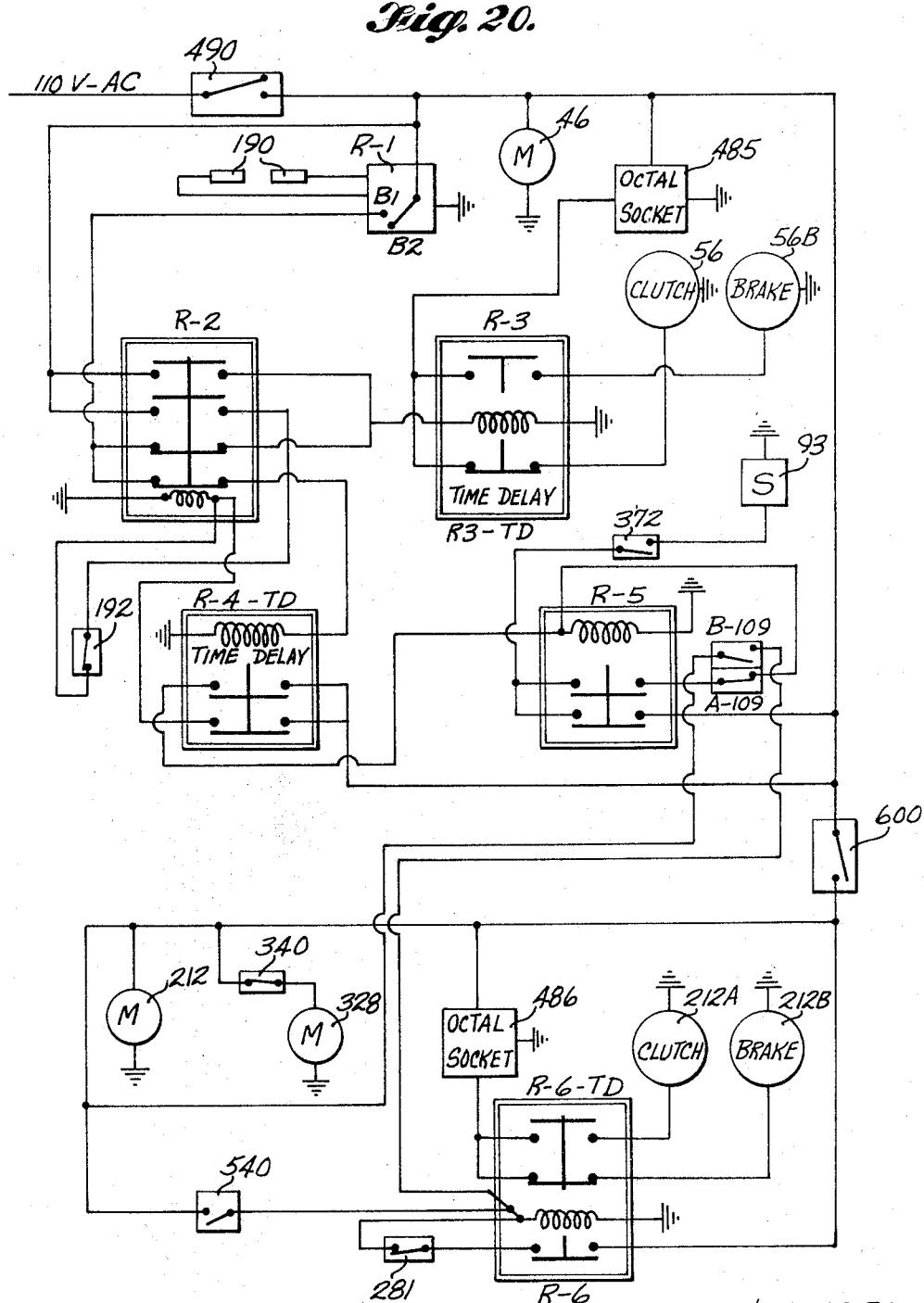

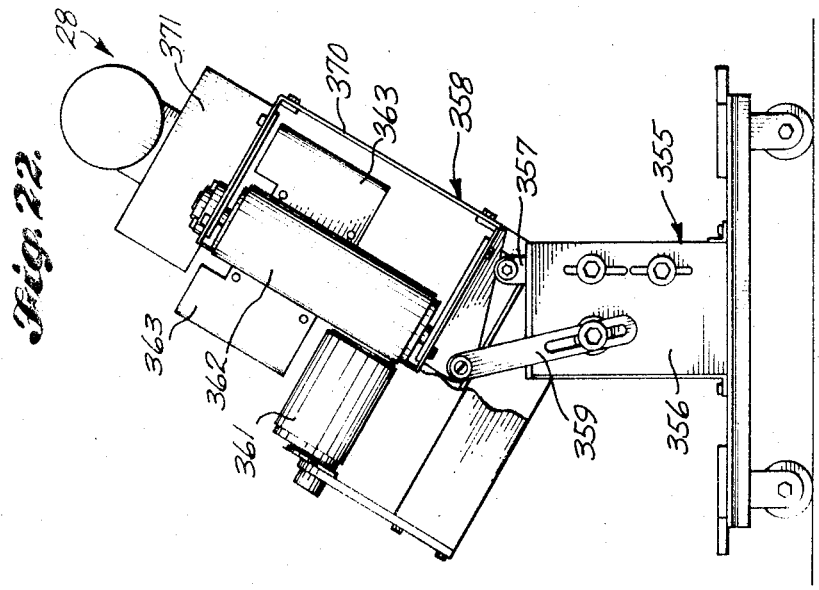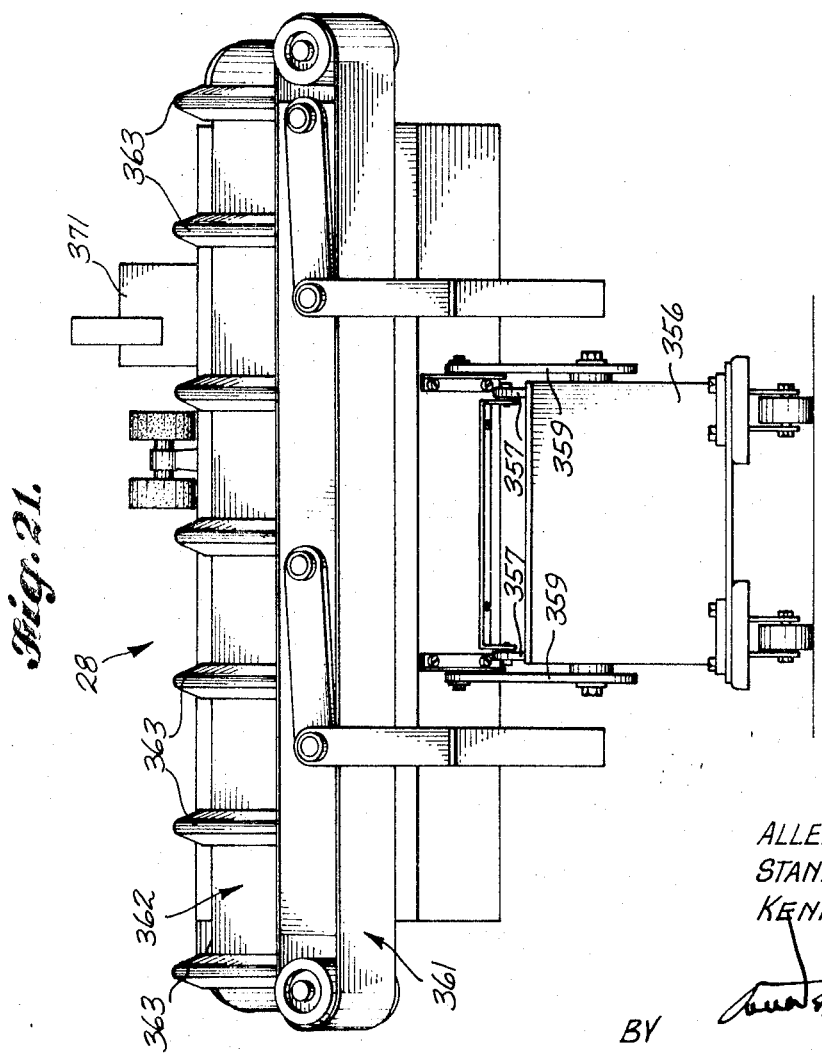

United States Patent Office 3,516,221
Patented June 23, 1970

1

3,516,221
AUTOMATIC BAGGING MACHINE
Allen D. Paxton, Fresno, Calif., and Stanley K. Paxton and Kenneth P. Paxton, Yakima, Wash., assignors to Paxton Sales Corporation, Yakima, Wash., a corporation of Washington
Filed Oct. 7, 1968, Ser. No. 765,352
Int. Cl. B65b 57/06, 43/26
U.S. Cl. 53—63
14 Claims

ABSTRACT OF THE DISCLOSURE

A balanced scale platform comprising a power driven downward sloping endless belt which is automatically disengaged from its power source while accumulating a batch of a given weight delivered thereon from a feed elevator, a weight sensor halting said elevator and reconnecting said power source to said belt to cause the latter to discharge said weighed batch through a bag holding scoop into said bag, said scoop automatically releasing said loaded bag to be carried away on a discharge conveyor, said scoop then providing itself with an empty bag during the ensuing batch weighing cycle.

BACKGROUND OF THE INVENTION

Automatic weighing of many different products is recorded in the prior art, the purpose being to equal or excel the accuracy of hand weighing operations and decrease the cost. While applicable to other products than fresh fruits which roll readily down a slight slope the present invention is provided especially for handling discreet articles having this characteristic of rollability.

SUMMARY OF THE INVENTION

Inasmuch as fresh fruit and vegetables are subject to damage by rough handling, it is a particular object of the present invention to not only increase the accuracy and lower the cost of weighing and bagging these products but to provide a machine for accomplishing this which handles the product gently.

To this end, the product is delivered from a pocket forming elevator onto a gently downwardly sloping endless belt which comprises the weighing platform of the scales. A bag holding scoop is positioned just below the lower end of said belt, to receive a weighed batch of product therefrom, said scoop, however, being out of contact with said belt, and being inclined at a somewhat steeper angle than said belt.

The upper of two pulleys about which said belt is trained is fixed on a driven shaft having a rubber driven roller fixed on an extending end thereof. A power mechanism for driving said belt includes a rubber drive roller which is normally spaced a short distance from said driven roller. A weight sensor mechanism responds to a batch of a given weight being delivered from said elevator onto said belt, to shift said drive roller into contact with said driven roller. As the drive roller is continuously rotating, this contact drives the belt to deliver said batch through said scoop and into a flexible plastic bag hanging therefrom.

The scale belt has two pairs of stop fingers extending perpendicularly therefrom at points equidistant in opposite directions from each other. Each weight cycle starts and stops with the scales belt halted and with one pair of said fingers extending upwardly from above the lower pulley of said belt and the other pair of fingers extending downwardly from below the upper pulley of said belt. Said one pair of fingers forms a stop for the product articles delivered onto the belt while it is halted. As the belt starts to deliver a weighed batch of articles into the

2 scoop, said one pair of stops swings downward about the lower pulley and the other pair of fingers swings upward about the upper pulley. A switch located beneath the lower pulley is engaged by said one pair of fingers to start the elevator to initiate the feeding of another batch onto the scale belt platform. The "other" pair of fingers, now projecting upwardly and travelling with the belt towards its lower end, pushes before it the batch being delivered to the scoop and prevents any of the new batch being delivered onto the belt mixing with the batch being concurrently discharged therefrom. In each batch discharge cycle of said belt, the latter travels just one-half its length, this movement halting when said "one" pair of fingers engages a switch, just as it arrives under the upper pulley of the scales belt, which switch causes the drive roller to shift out of contact with the driven roller and thus stops the belt.

Engagement of the switch just mentioned performs the further function of starting a bag replenishing cycle, the first step in which is to release from the scoop the bag filled with the product batch just delivered to said scoop, with said bag resting on a pocketed loaded bag discharge conveyor located beneath the scoop and extending laterally therefrom. The next step in said cycle is to start the last mentioned conveyor and cause it to travel the length of one pocket and then stop. From this point in the bag replenishing cycle, the scoop is rocked into horizontal position and carried towards and over a stack of bags and is inserted into the mouth of an inflated bag and extended therein to hold said bag and carry the same with the scoop as the latter returns to its starting position where it engages a switch terminating the bag replenishing cycle.

An "over-ride" switch is positioned to be closed by engagement of the new bag therewith as the scoop comes to a halt, this switch preventing delivery of a batch to the scoop in case the bag replenishing cycle fails to provide the scoop with a new bag.

BRIEF DESCRIPTION OF THE DRAWINGS

FIG. 3 is an enlarged semi-plan semi-sectional view taken on line 3—3 of FIG. 1.

FIG. 4 is an enlarged detail sectional view taken on the line 4—4 of FIG. 1.

FIG. 5 is a side elevational detail view taken on the line 5—5 of FIG. 4.

FIG. 6 is a side elevational view of lower portions of the batch weigher of the invention and the bag scoop associated therewith.

FIG. 7 is a fragmentary plan sectional detail view taken on the line 7—7 of FIG. 6.

FIG. 10 is a vertical longitudinal sectional view, taken on line 10—10 of FIG. 9, of the bag holding and replenishing mechanism.

FIG. 11 is a vertical longitudinal sectional view, taken on the line 11—11 of FIG. 9, of the bag holding and replenishing mechanism showing, in broken lines, two advanced positions of the scoop in replenishing itself with a fresh plastic bag for use in the next following batch bagging cycle.

FIGS. 12-15 inclusive are diagrammatic views supplementing FIG. 11 in further illustrating successive positions of the scoop in a bag replenishing cycle.

FIG. 16 is a fragmentary side elevational view of the bag holding and replenishing mechanism of the invention and shows particularly the bag stack handling device thereof.

FIG. 17 is an enlarged sectional detail view of the bag stack holding wicket and bag inflating device of the invention.

FIG. 18 is an end view of FIG. 17 taken in the direction of arrow 18.

FIG. 19 is a diagram of the electrical controls for the loaded bag carry-away conveyor.

FIG. 20 is a diagram of the electrical controls for the batch weigher and bagger of the invention.

FIG. 21 is a front elevational view of the loaded bag carry-away conveyor.

FIG. 22 is an end elevational view of FIG. 21.

DESCRIPTION OF THE PREFERRED EMBODIMENT

Figure 1:
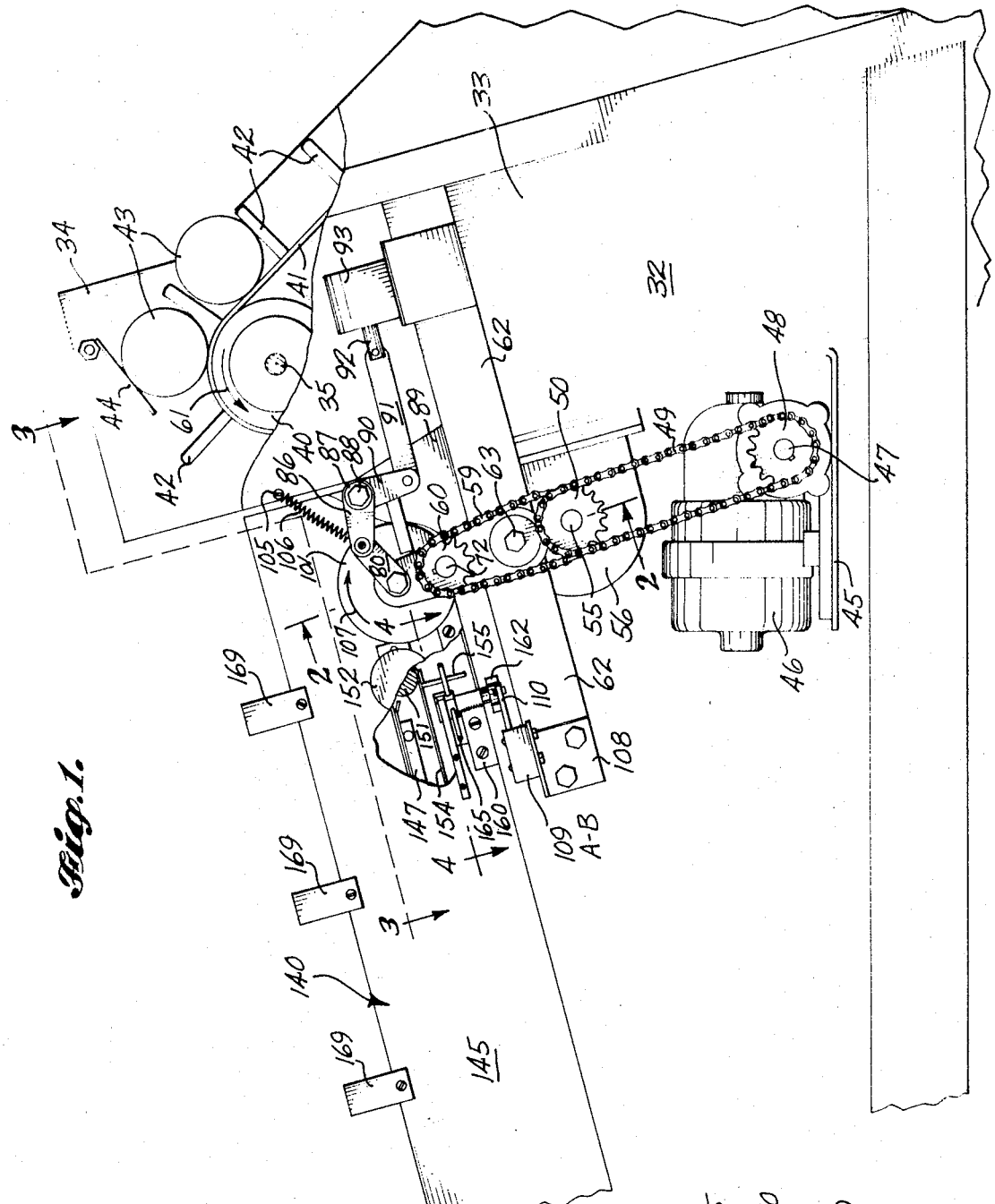
FIG. 1 is a fragmentary side elevational view of upper portions of the product elevator and the batch weigher of the invention, with certain portions thereof broken away to expose inner structural details.
Figure 2:
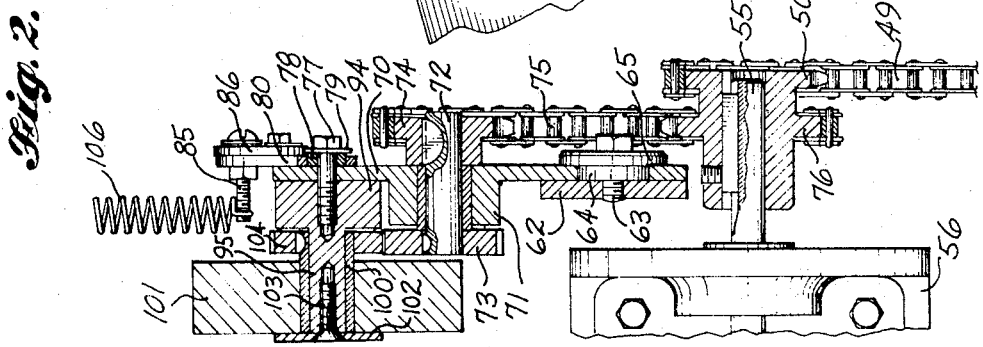
FIG. 2 is an enlarged detail sectional view taken on the line 2—2 of FIG. 1, illustrating the scales platform belt drive mechanism.

Referring specifically to the drawings, the preferred embodiment of the invention illustrated therein comprises an automatic bagging machine 25 which includes an automatic batch weigher 26, an automatic bagger 27 and an automatic loaded bag conveyor 28.

While the invention is adapted for use in weighing and bagging many different types of materials, the illustrated embodiment is particularly designed for weighing and bagging rollable fruits such as apples and will be described in its adaptation to this use.

The automatic batch weigher 26 includes a fruit elevator 29 and a scales 30, and is provided with a rigid frame 31 which rests on the floor. This frame includes an inclined column 32 including hollow sheetmetal side members 33 and 34 on which are mounted suitable bearings in which a driven shaft 35 journals. Mounted on shaft 35 is a driven pulley about which an endless belt 41 is trained, the latter being provided with fork-like fingers 42 for elevating fruit units 43 in single file from a suitable bin or other source of supply and delivering these fruit units to the upper end of the scales 30. A flexible wiper 44 is mounted between upper ends of the side members 33 and 34 to wipe against fruit units as these travel over the upper end of the fruit elevator 29 so that when said elevator is in motion, each fruit unit will start to gravitate downwardly from its uppermost position on said elevator in a common timed relationship with the travel of said elevator.

Mounted on a bracket 45 fixed to the column 32 is an electric motor 46 having geared connection with a drive shaft 47, the sprocket 48 on which is connected by an endless chain 49 to a double sprocket 50 mounted on an in-put shaft 55 of an electromagnetic clutch 56, having a brake 56B, which clutch is also mounted on bracket 45. The magnetic clutch 56 has an output shaft 57 fixed thereto a sprocket 58 which is connected by an endless chain 59 to a sprocket 60 mounted on driven shaft 35 so that when electric motor 46 is energized and electromagnetic clutch 56 is also energized, the fruit elevator 29 will be caused to function by rotation of driven pulley 40 in the direction of the arrow 61 in FIG. 1.

Fixed on frame column 32 and extending at right angles therefrom to the left as shown in FIG. 1 is a frame plate 62. Rigidly secured to frame plate 62 by a screw 63 are a pair of washers 64 and 65, the latter of which has a greater diameter than washer 64. Journaling on the washer 64 and secured in place by the washer 65 is an arm 70 made of plate material which has integrally formed thereon a bearing 71 which is located approximately midway between the lower pivotal axis of said arm and its upper end. Journaled in bearing 71 is a stub shaft 72 having a pinion gear 73 fixed to its inner end and sprocket 74 fixed to its outer end, the latter being connected by an endless chain 75 to the inner sprocket 76 of double sprocket 50. Secured by a screw 77 to an upper portion of arm 70 are washers 78 and 79, the diameter of the latter exceeding that of the former so that a link 80 journals on the washer 78 and is secured in place by the washer 79. The outer end of this link is pivotally connected by a screw 85 to an arm 86 of a bell crank 87 which is pivoted on a screw 88 which is threadedly received in a suitable tapped aperture formed in a bracket 89 provided on frame plate 62. The lower arm 90 of said bell crank is pivotally connected to a link 91, the opposite end of which connects to the armature 92 of a solenoid 93 which is mounted on frame plate 62.

The screw 77 extends through the arm 70 and is threadedly received in a tapped hole provided in a head 94 having concentrically formed therewith a stub shaft 95 on which journals a hollow shaft 100 of a rubber drive roller 101 which is secured on said shaft by a washer 102 held in place by a screw 103 which is screwed into a tapped hole provided in the end of stub shaft 95. Fixed on the inner end of hollow shaft 100 is a pinion gear 104 which meshes with pinion gear 73.

Secured at one end to screw 85 and at its other end to a screw 105 fixed on hollow sheetmetal member 33 is a coiled spring 106 which constantly urges the arm 70 into the position in which it is shown in FIG. 1, so that this arm takes this position whenever the solenoid 93 is de-energized.

As the electric motor 46 is constantly running during the operation of the invention, the rubber drive roller 101 is thus constantly being rotated in the direction of the arrow 107 in FIG. 1.

Mounted on a bracket 108 provided on the left end of frame plate 62 is a microswitch 109 having an actuating arm 110 with a roller 115 mounted thereon.

Figure 8:
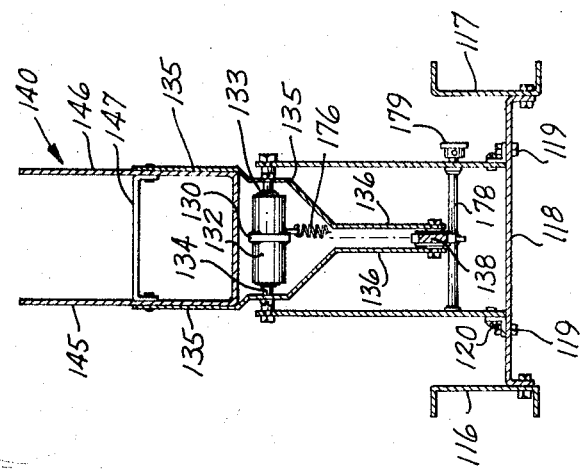
FIG. 8 is a vertical transverse sectional view taken on the line 8—8 of FIG. 6.

Supported on two channel beams 116 and 117 which are fixed upon the inclined column 2 of the fruit elevator 29 and extend horizontally leftward therefrom as shown in FIGS. 1, 6 and 8, is the aforementioned scales 30 of the invention. This scales includes a sheetmetal floor 118 opposite margins of which are bent downwardly and secured to channel beams 116 and 117 by bolts 119 as shown in FIG. 8. This floor is provided with angle iron stringers 120 which are secured to the lower edges of a pair of approximately triangular spaced frame plates 121 which pivotally support, adjacent their apices, a shaft 122 on which are provided ball bearings 123 which rotatably support the hub of a scale beam 125 having a short arm 130 and a long arm 131. The short arm 130 is also provided with a hub 132 for housing ball bearings 133 and a shaft 134 extending through said ball bearings is secured at its opposite ends to a pair of thin sheetmetal plates 135 which are symmetrically bent to appear in cross-section as shown in FIG. 8 so as to have closely spaced parallel lower portions 136 which are pivotally connected by a bolt 137 which passes through a ball bearing mounted in the corresponding end of a horizontal link 138, the opposite end of which also provides a ball bearing which is fixed on a shaft 139 opposite ends of which are mounted on space frame plates 121.

The plates 136 are shaped in their upward portions to conform to and support a sheetmetal shell 140 which is U-shaped in cross-section with parallel side walls 145 and 146. A sheetmetal scales platform 147 has down bent side edge portions which are secured to the side walls 145 and 146. Journaled in suitable bearings 148 and 149 provided in side walls 145 and 146 is a driven shaft 150 having mounted thereon, between said walls, a driven pulley 151. The shaft 150 extends beyond bearing 149 and has mounted thereon a driven rubber roller 152 which is axially aligned with and closely juxtaposed relative to drive roller 101. Pivotally mounted at its opposite ends on side walls 145 and 146 just beyond the lower end of platform 147 is an idle pulley 153. An endless conveyor belt 154 is trained about the pulleys 151 and 153 so that the upper flight of said belt rests upon the scales platform 147. Secured to belt 154 and extending perpendicularly outwardly therefrom at two points spaced equal distances in opposite directions from each other are two forked fingers 155. In the operation of the invention, fruit units 43 are fed onto the endless belt 154 while this is halted, as shown in FIGS. 1 and 6, with one of the forked fingers 155 extending upwardly from said belt just above the idle pulley 153 thereof and with the other of said forked fingers extending downwardly from said belt just under the driven pulley 151 as shown in FIG. 1.

Rotatably mounted in a bracket 160 fixed to the outer surface of side wall 145 of the shell 140 at a point just below and leftward of driven pulley 151 is a bracket 160 providing a bearing in which the shaft 161 which is constantly engaged by a leaf spring 164 which biases said rotor so that when it is rotated it always stops in one of four positions which are disposed 90° apart. The head 163 has four fingers 165 which extend therefrom so that said fingers are spaced about said head at intervals of 90° but are out of phase with the faces of square head 163 by an angle of 45° as shown FIG. 4. Rotor 162 is so mounted that one of fingers 165 is always extending into the path of one of the forked fingers 155 as said forked finger travels towards its terminal position disposed just beneath the driven pulley 151. The engagement of said forked finger 155 with the rotor finger 165 causes a quarter revolution of the switch actuating rotor 162 which is formed on the lower end of shaft 161. This rotor is shown in plan in FIG. 4 as having the outline of a cross forming four recesses 166 which are separated by four high points 167. The switch 109 is so mounted that the roller 115 thereof extends into the adjacent recess 166 whenever the rotor 162 is halted as shown in FIG. 4. Whenever this rotor is given a quarter turn as by engagement of a forked finger 155 therewith, the roller 115 is caused to pass over one of the high points 167 on the rotor thereby actuating microswitch 109, the result of which will be made clear hereinafter.

Also secured between the walls 145 and 146 so as to lie in the same plane as the scales platform 147 is a transfer floor plate 168 which is cut out at its leading and following edges to permit the passage of forked fingers 42 on the fruit elevator 29 and forked fingers 155 of the scales platform belt 154. The plate 168 receives fruit units 43 from elevator 29 and delivers these to scales belt 154.

Supported at intervals along the upper edges of the side walls 145 and 146 of the shell 140 are inverted U-shaped brackets 169 each of which pivotally supports therein a rod 170 from which a flap 175 is pivotally hung, these flaps extending into the path of fruit units 43 rolling along the endless belt 154 after having been delivered thereto from the fruit elevator 29 to prevent these units attaining excessive speed.

The scales 30 is so designed that the center of gravity of the sheetmetal shell 140 and associated elements comprising the weighing platform of said scales is in vertical alignment with the ball bearings 133 on which this structure is supported. Pivotally secured to the long arm 131 of the scale beam 125 is a coil spring 176, the lower end of this spring being connected to an arm 177 of a bell crank 178 by the adjustment of which the tension of this spring may be modified to vary the weight of the batch to be delivered from the scales. Pivotally mounted on a shaft 180, the ends of which are supported on the spaced plates 121, is a light beam interrupting arm 181 which is connected by an adjustable link 182 to the extremity of the long arm 131 of the scale beam 125. Mounted on channel beams 116 and 117 and extending upwardly therefrom on opposite sides of the extremity of arm 181 are brackets 183 and 184 on which are respectively mounted a light beam source 185 and a photoelectric cell 190 which are so related to the arm 181 that when a batch of a given weight of fruit units is fed onto belt 154, the arm 181 is elevated so as to break the beam emanating from light source 185 thereby breaking the electric circuit maintained by photo-electric cell 190, with a result to be explained in describing the operation of the invention.

Mounted on a bracket 191 fixed to one of the triangular frame plates 121 is a microswitch 192 having a spring 193 which is adapted to be actuated by engagement therewith by one of the forked fingers 155 when the latter passes downwardly around the idle pulley 153 and starts travelling rightwardly. The purpose of microswitch 192 being thus actuated will be made clear in the description of the operation.

The automatic bagger 27 of the invention includes a scoop 194 which is provided for the purpose of receiving a batch of fruit units 43 when the latter are discharged from the batch weigher 26 and transferring this batch into a flexible polyethylene bag which is supported on said scoop. To perform this function the scoop 194 is always positioned as shown in FIG. 6 relative to the discharge end of the batch weigher. As aforementioned, the scoop 194 has associated therewith a means for replenishing the loaded bag with an empty bag in preparing said scoop for the next successive bagging cycle to be performed by the invention. The structure of the automatic bagger 27 for accomplishing this will now be described.

Figure 9:
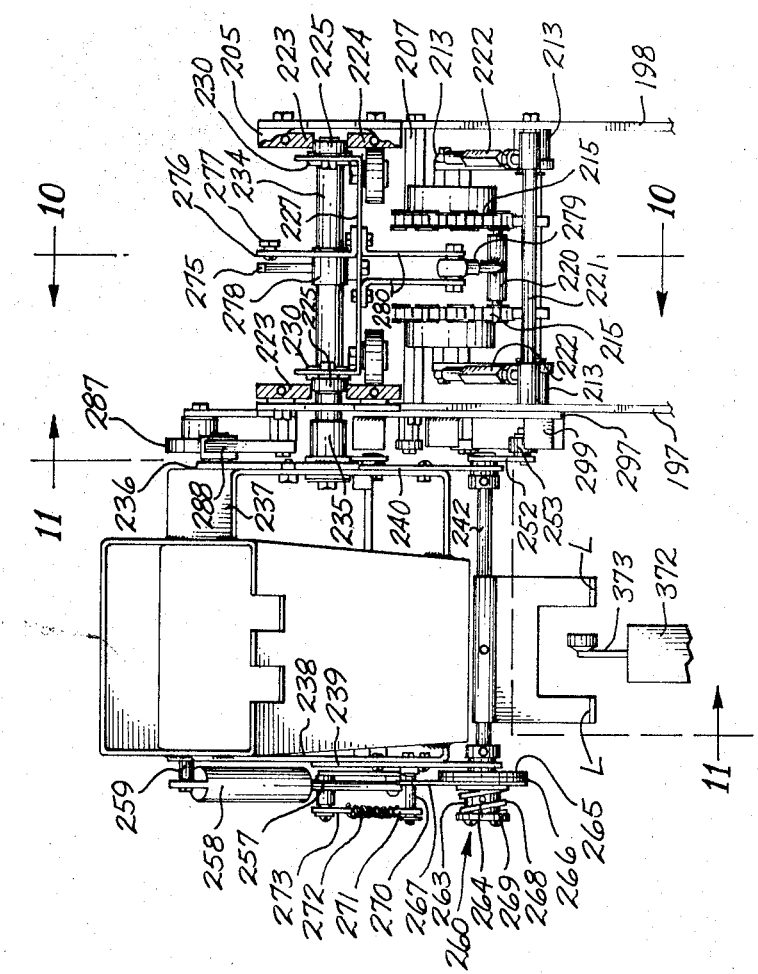
FIG. 9 is a vertical transverse sectional view taken on the line 9—9 in FIG. 6 and constituting an end elevational view of the bag holding and replenishing mechanism of the invention.

Referring particularly to FIGS. 6, 9, 10 and 11, the bagger 27 has a frame 195 including a hollow column 196 on which are fixed spaced frame plates 197 and 198 which extend horizontally from said column and are supported thereon in cantilever fashion. Referring now to FIG. 9 in which said frame plates are seen in the end elevation, and FIG. 10 which is a view taken on a plane parallel with and disposed between said plates, it is to be noted that these plates are held in spaced relation by spacer bars 199 located near their lower edges and on which are mounted lower chain flight supporting bars 200. The outer ends of plates 197 and 198 are also connected by a cross plate 205 which is mainly broken away in FIG. 9 to better show the parts of the structure which would otherwise be hid thereby. Upper chain flight supporting rails 206 are supported in vertical alignment with the lower chain flight rails 200 by studs 207 mounted on the frame plates 197 and 198. Pivotally mounted on studs extending inwardly from frame plates 197 and 198 near the junction of the latter with the frame column 196 are sprockets 208 each of which has coaxially provided thereon and affixed thereto a spur gear 209 which meshes with one of a pair of spur gears 210 which is fixed on a shaft 211 which journals in suitable bearings provided on the frame plates 197 and 198. This shaft is provided with suitable means for connecting the same to an electric motor 212, by which the automatic bagger 27 is driven. Motor 212 has a clutch 212A and brake 212B which control the driving of the bagger by motor 212. Pivotally mounted on frame plates 197 and 198 near their outer ends are a pair of arms 213 which extend upwardly and have pivotally mounted on their upper ends a pair of sprockets 214 which are in radial alignment with and connected sprockets 208 by endless chains 215. Pivotally connected at its opposite ends with corresponding links in chains 215 is a tubular cross member 220 which travels with said chains when motor 212 is energized to drive the latter. Pivotally mounted on a shaft 221 the ends of which are fixed to frame plates 197 and 198 is a pair of turnbuckles 222, the opposite ends of which pivotally connect to upper ends of arms 213, these turnbuckles being provided for keeping chains 215 tight.

Secured to inner faces of frame plates 197 and 198 are upper and lower track bars 223 and 224 which are spaced apart to form guides for four nylon rollers 225 which are pivotally mounted on horizontal axes on side flanges 226 formed upwardly from a sheet metal carriage 227 on which the scoop 194 is mounted. Also pivotally mounted on carriage 227 on vertical axes so as to roll against inner faces of lower track bars 224 are four nylon rollers 228. The frame plates 197 and 198 are provided with horizontal slots 229 which are located opposite the spaces between the upper and lower track bars 223 and 224. Bearings 230 are provided in side flanges 226 of carriage 227 and a shaft 234 is journaled in said bearings and extends leftwardly, as viewed in FIG. 9, through the slot 229 in frame plate 197. This shaft has a hub 235 fixed to the extending end thereof, said hub being fixed to a plate 236 which in turn is fixed to a channel shaped bracket 237.

Upper and lower ends of the bracket 237 are welded to the body of the scoop 194 as shown in FIG. 9. Welded to the outer side of the scoop 194 is a vertical plate 238. Secured to outer faces of the plate 238 and the U-shaped bracket 237 (below the plate 236) are plates 239 and 240 respectively, which provide bearings for shafts 241 and 242.

Between said bearings, shaft 241 has fixed thereon an expansive sheetmetal wall 243, while shaft 242 has fixed thereon, between said bearings, an expansive sheetmetal wall 244. As shown in FIG. 9, the outer edge of expansive wall 244 has a deep notch 245 formed therein, the purpose of which will be made clear later. Outer edges of walls 243 and 244 have bag retaining outward bent lips L.

Fixed on the inner end of shaft 241 is an arm 250 having a roller 251. Fixed on the inner end of shaft 242 is an arm 252 having a roller 253. On its outer end, shaft 241 has fixed thereto a rocker 254 having legs 255 and 256. Pivotally connected to leg 256 is one end of a piston rod 257 of a dashpot 258 for damping the rotation of shaft 241, the other end of said dashpot being pivotally connected at 259 to scoop 194.

Just outside the plate 239, the shaft 242 is provided with a friction clutch 260 which includes a sleeve 263 which is secured to said shaft by a pin 264, said sleeve having a circular flange 265 formed on its inner end. A friction disc 266 is slipped over said sleeve against said flange and a pear-shaped plate 267 is slipped over said sleeve against said friction disc and is pressed against the latter by a coiled spring 268 which is confined by a cap plate 269 mounted on the end of the sleeve. A bolt 270 mounted on the scoop plate 239 extends through a suitable aperture in pear-shaped plate 267 so as to prevent the rotation of the latter on the sleeve 263 and provides a pivotal mount for a tab 271 which is connected by a coil spring 272 to a similar tab 273 pivotally mounted on the leg 255 of rocker 254.

Pivotally mounted on plate 236 is a nylon roller 274 which is spaced a substantial distance from the shaft 234 on which the scoop 194 is mounted and functions in cooperation with certain cams presently to be described in controlling the rotational attitude of said scoop about said shaft during the operation of the automatic bagger 27. Fixed on shaft 234 at the center of carriage 227 is an arm 275, the outline of which is shown in FIG. 10, this arm being connected to a bracket 276, fixed on said carriage, by a contractile spring 277. A dashpot 278, provided on the carriage 227 is disposed in the path of the arm 275 to provide a cushioned stop for the latter when the shaft 234 is freed from restraint to permit it to be rapidly rotated by the biasing torque applied thereto by spring 277.

Fixed to the middle of tubular cross member 220 is a pitman 279 which is adjustable in length and pivotally connects at its opposite end with a pair of triangular plates 280 which are fixed on the bottom of sheetmetal carriage 227. Mounted on the inner face of frame plate 197 is a microswitch 281 having a roller 282 for actuating the same. Pivotally mounted on the inside of said frame plate is a cam 283 which has a trigger 284 engagement with which by the member 220 when the latter is travelling with endless chains 215 rocks said cam which engages roller 282 and actuates microswitch 281 to halt the travel of said chains with said member 220 positioned as shown in FIG. 10. When the chains are thus halted by actuation of microswitch 281, the scoop 194 is positioned as shown in FIG. 6. It is with the parts of the automatic bagger 27 so positioned that this mechanism of the invention starts and concludes each cycle of its operation which is for the purpose of disconnecting a loaded bag from the scoop 194 and replacing said loaded bag with a new empty bag. During each such cycle of operation the endless chains 215 completely traverse their length just once and then halt in the position they were in when the cycle started and which is shown in FIG. 10.

It is to be noted that the connection of said chains through member 220 and pitman 279 with the carriage 227 causes the latter together with the scoop 194 mounted thereon to be reciprocated along a horizontal path defined by upper and lower track bars 223 and 224 over a distance practically equal to the horizontal distance travelled by the cross member 220 during that cycle. It is to be noted that the member 220 at the conclusion of each cycle as shown in FIG. 10 stops short of the extreme left end of its travel during each cycle, this portion of its travel taking place at the initiation of the next cycle.

Incidental to the horizontal reciprocation of scoop 194 above described during each cycle of operation of the automatic bagger 27, the scoop is rotated partly by engagement of the nylon roller 274 mounted thereon with certain cams provided on the frame plate 197 and partly by the biasing action of spring 277 on shaft 234, while suitable manipulation occurs of the expansive walls 243 and 244 of the scoop, during each such cycle, by engagement of rollers 251 and 253 of said expansive walls with other cams provided on the front face of frame plate 197. These cams will now be described.

Fixed on a bracket 286 which is secured to and extends upwardly from the upper edge of frame plate 197 is a circular cam 287 and a concave cam 288 which is disposed below cam 287, these cams being coplanar with each other and with roller 274. Also mounted on frame plate 197 on its upper edge and at the opposite end thereof is a triangular bag wiper supporting bracket 289 from the upper end of which is supported a bag wiper 290. At the inner end of frame plate 197 just beyond the bracket 289 is a bracket 295 on which is supported a cam 296 which is in coplanar relation with the cams 287 and 288. Mounted as by welding on a plate 297 which is fixed to the front face of frame plate 197 and with the front edges thereof coplanar with the front edges of cams 287, 288 and 296 are strip metal cams 298, 299, 300 and 301. The shapes of these respective cams are clearly shown in FIGS. 11–15 inclusive.

Mounted on suitable studs on the front face of frame plate 197 in parallel horizontal relation are bar cams 302 and 303, the cam 303 being contiguous with the inner end of strip cam 298. Mounted on the front face of frame plate 197 just below the bracket 289 is a strip cam 304. The functions of all of the cams above described will be made clear in describing the operation of the invention.

Mounted on the frame column 196 is a bag magazine 310 which includes a pair of parallel horizontal arms 311 and 312 which are pivotally mounted at their inner ends on the outer end face of said column and extend forwardly beyond said column where they pivotally connect with parallel horizontal studs 313 which are fixed on a vertical leg 314 on the top end of which is fixed a bag stack supporting platform 315. Rotatably mounted on the inner face of arm 311 is a roller 316 which is engaged by a spiral cam 317 which is fixed on a shaft 318 which journals in bearings 319 of a bracket 320 fixed on said column. Mounted for free wheeling uni-directional rotation on the inner end of shaft 318 is a free wheeling clutch 325 having a sprocket 326 which is connected by an endless chain 327 to a geared motor 328 which drives said sprocket 326 at a relatively slow rate. Fixed on the outer end of shaft 318 is a hand wheel 329 by which the shaft 318 may be rotated freely in the same direction it is driven by said motor for the manipulation of the empty bag magazine 310 in replenishing the stack of bags therein, as will be described in the operation of the machine.

The platform 315 has side walls 330 and 331 along its front and rear edges for holding a stack 332 of individual flat polyethylene bags 333 on said platform. The platform has a pair of holes near its front edge for receiving parallel rods 334 of a wire wicket 335 which wicket rods also extend through holes provided in flaps 336 which extend outwardly from the open ends of the bags 333 in the stack 332. Mounted on the column 196 above the platform 315 is a switch 340 having an actuating finger 341 which rests upon the top of the stack 332 and causes the operation of the motor 328 to elevate the platform 315 and to halt such elevation whenever the upper face of the stack reaches a predetermined level.

Mounted on a bracket 342 which is fixed on frame plate 197 just under the adjacent edge of bag stack platform 315 is an air nozzle 343 which is supplied with air through a flexible tube 344 leading to a suitable blower (not shown). This nozzle includes a vertical tube 344 which curves at its upper end so as to point slightly downwardly just above the upper level of the bag stack at which said stack is maintained by the operation of the switch 340 as above described. The nozzle 343 extends inwardly just over the bight 345 of the wicket 335 and directs a blast of air downwardly and horizontally against the mouth of the uppermost bag 333 in the stack 332 so as to inflate this uppermost bag as shown in FIG. 11. The nozzle has a horizontal dividing wall 346 which divides the air delivered therefrom into a lower blast which inflates the bag and an upper blast which an upturned end portion 347 of said wall deflects upwardly to oppose the too ready escape of air from the upper portion of the bag and thereby stabilize the inflation of the bag so as to facilitate the scoop 194 picking up this bag in the automatic functioning of the bagger 27. A pair of spring biased latches 348 are pivotally mounted on the air nozzle 343 on a pivot pin 349, these latches having notches 350 for engaging and retaining in place a wicket 335 while loading the platform 315 with the stack 332 of plastic bags.

Referring now to FIGS. 6, 9, 10, 11, 21 and 22, the automatic loaded bag conveyor 28 is seen to include a rollable chassis 355 including a hollow rectangular body 356 having a vertically adjustable pair of bars 357 upon the upper ends of which is pivotally mounted a duplex conveyor 358, the angular attitude of which is determined by a pair of bars 359 which are pivotally mounted on said conveyor and are adjustably secured to the body 356. The duplex conveyor includes a table 360 on which is mounted two belt conveyors 361 and 362 which are positioned at right angles with respect to each other with belt conveyor 361 inclined at approximately 30° from horizontal and belt conveyor 362 inclined approximately 30° from vertical. Belt conveyor 362 is provided with pocket forming sheet metal dividers 363 which divide the space along said conveyor into pockets 364. The conveyors 361 and 362 are jointly driven by a geared electric motor 365 having a magnetic clutch 366 and brake 367. A frame 370 provided on table 360 extends upwardly to the rear of and over the belt conveyor 362 and the latter conveyor is mounted between said frame and said table. While loaded bags carried on conveyor 361 may be manually closed, any of several well known bag closing machines available on the market may be used in the present invention. For instance, a Kwik Lok automatic closure applying machine 371 is diagrammatically illustrated in the drawings as supported on frame 370.

This machine applies Kwik Lok type closures made of flat clips of polystyrene each having a closure aperture connected with one edge of the closure by a narrow opening forming pointed jaws on the opposite sides of the opening through which the bag neck is admitted to the aperture, thus closing the neck of the bag. The bag closing machine 371 functions automatically upon the presentation of the loose neck of a loaded bag to the machine which is accomplished in a manner which will be made clear in the description of the operation.

The loaded bag conveyor 28 of the invention is positioned adjacent the automatic bagger 27 thereof so that one of the pockets 364 which is located at the left end of the conveyor 362 is located directly below the scoop 194 of the invention as shown in FIG. 11. In this view it is to be noted that a switch 372 is mounted on the frame 370, this switch having a roller arm 373 which is positioned in the path of the expansive wall 244 of the scoop 194 when the latter returns from a bag replenishing reciprocation to the position in which it is shown at the right end of FIG. 11. This view of the scoop shows it with a new empty bag suspended from the expansive walls 243 and 244 of the scoop so that the notch 245 in wall 244 is covered by the bag and thus will not receive the roller arm 373 of switch 372. Thus the switch 372 is actuated by engagement of the bag with roller arm 373 which is the condition illustrated in FIG. 11. Return of the scoop 194 to the position shown in FIG. 11 without a bag 333 will fail to actuate switch 372 because the switch arm 373 will be received by the notch 245 in expansive wall 244 and leave the switch 372 in its normally open condition.

Also shown in FIG. 11 is a switch 374 which is mounted on the frame 370, this switch having a roller arm 375 which extends into the path followed by the dividers 363 of the belt conveyor 362 so that as each of these dividers passes this switch it engages roller arm 375 and actuates switch 374, the significance of which will be made clear in the description of the operation.

Referring to FIG. 10, a switch 376 is mounted on a suitable bracket provided on the inner face of frame plate 197, this switch having an actuating roller arm 377 which lies in the path of the carriage 227 so as to be engaged and said switch actuated by the initial leftward movement of said carriage at the beginning of each of the bag replenishing cycles of the automatic bagger 27 of the invention. Switch 376 controls the starting of belt conveyors 361 and 362 and when actuated starts these conveyors to travel to carry away a loaded bag just deposited on these conveyors from the scoop 194 as will be made clear in the description of the operation. When the belt conveyors 362 and 361 are thus caused to travel, this travel is halted when a divider 363 of the belt 362 next engages the roller arm 375 and actuates switch 374.

OPERATION

As pointed out in the summary of the invention, in which the operation of the latter is briefly described, the embodiment thereof illustrated and described herein is particularly designed for weighing and bagging rollable fruits such as apples which are referred to herein as rollable fruit units 43. These units are fed onto the fruit elevator 29 so as to fill the pockets provided herein between adjacent pairs of fork-like fingers 42 so that when said elevator is being driven, in the operation of the device, one fruit unit 43 is delivered over the upper end of the elevator and gravitates downwardly therefrom onto the transfer plate 168 as each finger 42 travels about the upper pulley 40 of the elevator 29. From the plate 168, this unit rolls by gravity directly onto the upper end of the upper flight of the scales belt 154 and by virtue of the slope at which the belt is inclined, rolls down this belt until it either engages the forked finger 155 which extends upwardly from said upper belt flight just above the lower pulley 153, or is stopped by engagement with other pieces of fruit previously delivered to the belt 154 in a current batch weighing cycle. The flaps 175 which hang downwardly from brackets 169 over the belt 154, are to retard the downward rolling of the fruit units 43 so as to prevent these units attaining sufficient speed as to injure these when they collide with the forked finger 155 at the lower end of the belt or with other pieces of fruit accumulated against said finger.

FIG. 6 illustrates the mechanism of the automatic batch scales 30 of the invention and shows how the fruit units 43 accumulate back of the upstanding finger 155 at the lower end of the halted belt 154. It also shows how the batch thus accumulating on belt 154 is weighed by the scale beam 125 causing the spring 176 to be elongated and the light beam interrupting arm 181 to be swung upwardly until eventually it intercepts the light beam travelling from the light source 185 to the photo-electric cell 190. As is common in the operation of scales receiving a series of units as large as an apple, there comes a point where delivery of one of said units causes the arm 181 to "bobble" upwardly to momentarily interrupt said light beam, although the delivery of this particular piece of fruit to the scales has not raised the weight of the entire batch being weighed to equal the minimum weight which a batch must have before it is delivered to a bag for packaging. Due to this fact, the darkening of photocell 190 by the upward swinging of the arm 181 is only momentary and the arm 181 returns downwardly as soon as the shock felt by the scales to delivery of said single piece of fruit has been dissipated.

To prevent another fruit unit 43 being delivered to the scales 30 just in case the first mentioned piece of fruit had raised the batch weight above the required minimum, the invention immediately halts the operation of the elevator 29 upon photocell 190 being darkened by even a momentary upward bobbing of the arm 181. Provision is made in the electrical system of the invention so that if the darkening of the photocell 190 proves to be only momentary, as would indicate that the batch being weighed has not yet reached its minimum value, the travel of the elevator 29 will be immediately resumed to deliver one or more further fruit units 43 to the scales 30. These are delivered one at a time, and the first of these pieces of fruit, so delivered after the batch weighed had reached a sufficient value to cause the momentary darkening of the photocell 190, will immediately cause an upward bobble of arm 181 and redarkening of photocell 190, this time for a longer period than the darkening caused by the first upward bobble of arm 181. The invention makes use of time delay relays to determine when the photocell 190 has been darkened for a sufficient length of time to indicate that the batch being weighed in the scales 30 has definitely reached a value above the required minimum. When this fact is indicated in the operation of the electrical mechanism, the latter functions to not only continue the fruit elevator 29 in halted condition, but also provides an immediate actuation of the means for discharging the batch, thus weighed in the scales 30, to the automatic bagger 27 of the invention, and the initiation of another batch weighing cycle in the scales 30 just as soon as the delivery of the batch already weighed therein has commenced. Thus the elevator 29 is started almost immediately after the scales 30 starts to perform its function of discharging the batch weighed in the immediately preceding cycle so that a minimum loss of time occurs between successive batch weighing cycles.

When a weighed batch of fruit is thus delivered from the scales 30 automatically through the scoop 194 of the bagger 27 into an inflated bag 333 suspended from said scoop as shown in FIG. 11, this filled bag rests downwardly and rearwardly against conveyors 361 and 362 in a pocket 364 formed between two adjacent conveyor dividers 363. The automatic bagger 27 is responsive to the performance of the batch discharge function of the scales 30, to initiate a bag replenishing cycle in the mechanism of said bagger. This cycle starts by the engaging of electric clutch 212A and the releasing of electric brake 212B whereby motor 212 starts the endless chains 215 in motion so as to cause these to travel about the sprockets 208 and 214 exactly the distance of the length of said chains and then come to a halt. Referring to FIGS. 9, 10 and 11, it is to be noted that the cross member 220 connecting chains 215 and which in turn is connected by pitman 279 to the carriage 227 upon which the scoop 194 is mounted, causes the scoop 194 to make a complete horizontal reciprocation during said cycle between the starting position in which this scoop is shown in FIGS. 6, 9, 10 and at the right hand end of FIG. 11, to the extreme leftward dotted line position in which said scoop is shown in FIG. 11 and then back to its starting position. At the start of this cycle, the bag 333 just loaded with the delivery thereto of a weighed batch of fruit, is still hanging from the expansive walls 243 and 244 provided on the scoop 194 approximately as shown in FIG. 11 (which shows this bag just before it has been loaded with fruit).

Referring again to FIG. 10, it will be noted that during the initial portion of the travel of chains 215 in the performance of a bag replenishing cycle, the member 220 is shifted towards the scoop 194 so as to shift the latter to the leftward as seen in FIG. 10 (or to the right as seen in FIG. 11). This short movement of the scoop 194 to its maximum retracted position illustrated in FIG. 14, is shown in intermediate stages in FIGS. 12 and 13. This initial portion of the movement of the scoop 194 in each bag replenishing cycle brings roller 251 into contact with cam 301 and roller 253 into contact with cam 299 while at the same time producing, through engagement of roller 274 with cams 287 and 288 a rocking of the scoop 194 from a relatively reclining position as shown in the right hand end of FIG. 11 to an almost vertical position as shown in FIG. 14. This motion of the scoop 194 causes, by the engagement of said rollers with said cams, an inward swinging of expansible walls 243 and 244 as shown in FIGS. 12, 13, 14 and 15 so that said walls completely disengage the loaded bag 333 which hung from these walls at the initiation of the bag replenishing cycle. The loaded bag thus released from the scoop 194 is left resting in the pocket 364 of the loaded bag conveyor 28 which is disposed directly below the scoop 194 at this moment.

The bag replenishing cycle, thus started, continues with the horizontal travel of the scoop 194 from the position in which said scoop is shown in FIG. 14 to the leftwardmost position of said scoop shown in broken lines in FIG. 11. It might be noted here that the inward folding of expansive wall 43 of the scoop from the position in which this is shown in FIG. 13 to the position in which this is shown in FIG. 14 is the result of the action on shaft 241 of the spring 272 which followed the slight rotation of said shaft produced by the engagement of roller 251 with cam 301 and which caused the line of tension of spring 272 to pass over the axis of shaft 241 thus permitting this spring to rotate shaft 241 to cause the excessive retraction of expansible wall 243 as shown in FIG. 14. The action of spring 272 may be observed in FIG. 6 which also shows the connection of dashpot 258 to shaft 241 in a manner to cushion the inward swinging of expansive wall 243 by spring 272 just described.

After thus divesting itself of the loaded bag 333, the scoop 194 is drawn to the leftward (as shown in FIG. 11) from its right hand position indicated in dotted lines to its leftwardmost position indicated in dotted lines. In this travel, the attitude of the scoop 194 is modified by engagement of the roller 274 thereon with the circular cam 287 and subsequently by engagement of the roller 253 with the cam 298 and the guide bars 302 and 303, so that a practically horizontal attitude is assumed by the scoop. This is indicated in the intermediate broken line position for this scoop shown in FIG. 11 in which roller 251 is brought into contact with the cam 296 while the expansive wall 243 is still completely retracted. The scoop is here closely approaching the open mouth of another inflated bag 333 so that as the cam 296 acts upon roller 251 to swing the wall 243 upwardly into its broken line position at the extreme left of FIG. 11, this wall is pressed against the inner face of said inflated bag 333 while the expansive wall 244 has been extended horizontally into a lower portion of said bag whereby the mouth of this bag is distended by the expansive action of these two walls so as to be firmly gripped by these walls with the wall 243 being biased upwardly by the action of spring 272 which has been caused to swing upwardly so that the line of application of its pressure is above the axis of shaft 241.

The expansive engagement of the legs L on the extremities of walls 243 and 244 with the mouth of the new empty bag 333 pulls this bag free from the wicket 335 so that said bag is carried along with the scoop 194 as it returns to its original position at the right hand end of FIG. 11. The bag replenishing cycle is concluded by the member 220 passing under the arm 284 of the cam 283 so as to actuate switch 281.

The initial movement of the carriage 227, leftward from its position shown in FIG. 10, brings the carriage into contact with the roller 224 of switch 376 thus actuating this switch. This initiates a cycle of movement of the autmatic loaded bag conveyor 28 causing this conveyor to travel a distance equal to the length of one pocket 364 thereof, so that the pocket holding the loaded bag 333 just deposited on this conveyor from the scoop 194, is moved out from underneath the scoop and said conveyor is halted wtih the next pocket 364 disposed beneath and in vertical alignment with said scoop.

Besides the switches already described, the electrical system of the automatic bagging machine 25 includes a relay R1 having points B1 and B2 this relay being preferably an autotron control A579BA. It also includes a relay R2, a relay R3 having a time delay unit R3TD, a time delay relay R3TD, a relay R5 and a relay R6 with a time delay unit R6TD. Octal sockets 485 and 486 are provided for converting 110 volts A.C. to 90 volts D.C. for use in actuating the clutch and brake mechanisms of the invention.

The supply of 110 volts A.C. to the system is controlled by a switch 490. When this is closed, electricity is supplied directly to normally open points B2 of relay R1. Points B2 are responsive to the electric circuit of photo-electric cell 190 and close when this cell is darkened. Alternating current is also supplied to the octal socket 485 and 90 volts D.C. is delivered from this socket to an open set of contacts in relay R3 which control the operation of brake 56B (the latter being provided on clutch shaft 57) and this brake being energized alternately with the clutch 56 through the operation of relay R3 and its time delay unit R3TD.

Alternating current is also supplied to two sets of open contacts in relay R5 and time delay relay R4TD. Alternating current is also supplied to motor 46 which runs continuously.

With the electric system energized by the closing of switch 490, the clutch 56 is engaged through the contacts of R3TD and the brake 56B is disengaged due to the open contact in relay R3. The elevator 29 is thus running. As fruit units 43 are delivered from the elevator 29 to the scales 30, and the weight of the accumulated batch in the scales approaches the preset minimum weight, the scales vane 181 rises in a bouncing motion (as items drop onto the scales platform 147) and actually indicates a weight in the scales which is above the true weight of the product delivered thereto. In these bounces, vane 181 interrupts the source of light in the sensor 190 causing a dark cell. Immediately upon the darkening of cell 190, contacts B2 and B1 close and current is delivered through these to the closed contacts of relay R2. One set of these contacts delivers current to the coil of relay R3 and time delay unit R3TD. The clutch 56 is thus disengaged instantly and the brake 56B is engaged, stopping the elevator belt.

The second set of contacts of relay R2 energizes the coil of time delay relay R4TD. As the contacts of the latter relay operate only after a time delay they will not close for a preset period of time, which is preferably one quarter of a second. If the minimum weight desired in each batch has not been attained in the scales 30 at this moment, the vane 181 will swing down from between the light source and the photocell 190 before the expiration of one quarter of a second from the darkening of the cell 190. This re-illumination of the photocell 190 will open the contacts at B2 and B1 and the brake 56B will be instantly disengaged and the clutch 56 re-engaged (after one tenth of a second delay), the latter delay being produced by the action of the time delay unit R3TD.

With the starting of the elevator 29 (after this having been momentarily stopped), another fruit unit 43 is delivered to the scales 30 and a second bouncing upward by the vane 181 causes the photocell 190 to be darkened and the elevator 29 to be again halted. If the fruit unit 43 just added fails to bring the weight of the batch being weighed up to the minimum preset weight, the vane 181 will again swing down to illuminate the photocell 190 and cause the elevator to be restarted to feed still another fruit unit 43 to the scales 30.

The bouncing up and down of vane 181 thus continues until the vane 181, after rising between the light source and the sensor, stays there for one quarter of a second which proves that the batch being weighed by the scales 30 now exceeds the minimum preset weight. When the darkening of cell 190 continues as the one quarter of a second delay period expires, the contacts of time delay relay R4TD close. Through one set of these contacts, current is delivered to the coil of relay R2 and energizes this relay causing the two open pairs of points thereof to be closed and the two closed points thereof to be opened. Current thus flows through one set of the normally open contacts, that are now closed, to switch 192 which is normally closed, thereby forming a holding circuit energizing the coil of relay R2. The second set of normally open contacts in relay R2 which are now closed, feeds current to the coil of relay R3, thus holding the latter relay energized because of the R2 holding circuit. This holds the brake 56B on and the clutch 56 disengaged, stopping the elevator 29 until switch 192 is broken thus opening the holding circuit. The second set of time delay contacts of relay R4TD, now closed, delivers current to the coil of relay R5.

The circuit energizing the coil of relay R5 closes the open contacts and feeds current through one set of contacts through switch 372 which is now closed because of the bag being in position for filling. Current then flows to solenoid 93 energizing the latter and causing it to engage the power roll 101 with driven roll 152 which drives the scale belt 154 and discharges the weighed batch from the scales 30 through the scoop 194 into the bag 333 hanging therefrom.

The second set of contacts of relay R5, now closed, delivers current through switch A109 to the coil of relay R5, thus setting up a holding circuit until switch A109 is open. Switch 109 comprises two switches with a common actuating lever and is therefore shown in FIG. 20 as switches A109 and B109.

As previously pointed out, switch 109 is momentarily actuated once during each weighing cycle at the conclusion of the delivery of a batch of fruit from the scales 30 to the scoop 194 and this takes place when one of the forked fingers 155 proceeds from the lower end of the belt 154 along the bottom to the upper end thereof and engages one of the fingers 165 of the star wheel which actuates switch 109. Prior, in point of time, to the actuation of switch 109, however, and at the beginning of a batch discharge cycle, the lowermost scales belt finger 155, as it turns about the pulley 153 from its upright position into a downwardly extending position, this finger 155 comes into engagement with the spring 193 attached to the arm of switch 192 so as to temporarily open this switch. This opens the circuit of the coil of relay R2 causing it to resume its normal condition shown in FIG. 20. This also opens the live circuit through relay R2 to relays R3, R3TD, and R4TD. This starts the elevator 29 and resumes delivery of units 43 into the scales 30.

The contacts of relay R4TD are now open leaving switch A109 as a single control over relay R5 through switch 372 which is closed by a bag being in place on scoop 194. This switch is also a single control to solenoid 93 and the scale belt movement continues until the finger 155 on the under side of the scale belt contacts and operates one of the fingers 165 so as to actuate switch 109 and thereby open the circuit to relay R5, switch 372, and solenoid 93 so as to de-energize the latter and stop movement of the scale belt 154. This half revolution of the latter belt takes approximately two seconds.

The above is true if a bag is in position on the scoop 194 but if, for some reason, a bag is not suspended from this scoop, the switch 372 is left open, and while all relays have current supplied to them, the power circuit of solenoid 92 is open. A batch of fruit may thus be delivered to the scales 30 and brought up to the minimum required weight and everything conditioned for the discharge of this batch into the scoop 194, but if there is no bag properly placed on this scoop so as to close switch 372, the solenoid 93 cannot be actuated so as to effect the discharge of this batch of fruit to the scoop 194. This is for preventing a malfunction by delivering fruit through the scoop when there is no bag to receive the same.

Referring now to the portion of the electrical system which drives the automatic bagger 27 of the invention, it is seen that the motor 212 by which the bagger is driven runs continuously and successive bag replenishing cycles of this bagger are accomplished by electrical control of a clutch 212A which connects motor 212 to the shaft 211 and brake 212B which applies a brake to the shaft 211 when clutch 212A is disengaged.

The electric system of the bagger 27 has a common power supply with the automatic batch weigher 26. When a switch 600 is turned on, electric current is supplied to motor 212 and the octal socket 486. Electricity is also supplied to switch 340 which is closed and to the motor 328 which operates the bag stack elevator 310. Through this motor and the cam 317 actuated thereby the bag stack is lifted until switch 340 is opened at a predetermined height and the motor stops. As bags are used and the height of the stack drops slightly, the switch 340 closes and the motor runs until the bag stack is again at the proper height which shuts the motor off again. This will continue until the bag stack is depleted, whereupon cam 317 is manually rotated to lower the platform back to its lowermost point and a fresh stack of bags is installed thereon.

In normal operation of the automatic bagging machine 25, the clutch 212A is disengaged and the brake 212B set. When switch B109 is operated, at the same time as switch A109, this closes B109 contacts and feeds current to the coil of relay R6 and time delay relay R6TD. Relay R6 reacts instantly and closes, setting up through switch 281 a holding circuit for the coil of the relay. Through the variable time delay contacts of relay R6TD, the closed contacts are now open which releases the brake circuit and opens the contacts which are now closed to the clutch. This connects the geared motor 212 to the drive shaft 211 to cause the chains 215 to travel about their path one complete revolution in accomplishing a bag replenishing cycle as above described. The engagement of trigger 284 by cross member 220 which opens switch 281, and thus the holding circuit of relay R6 causes the de-energizing of the latter which de-energizes clutch 212A and sets brake 212B. Switch 500 shown in the wiring diagram of FIG. 20 is just a bypass switch. If for any reason a bag is not picked up and delivered to the scoop 194, this switch will provide the opportunity to manually supply current to the coil of relay R6 and R6TD so as to re-cycle scoop 194 and cause it to receive a fresh bag.

Referring now to FIG. 19, the wiring system of the automatic loaded bag conveyor 28 is seen to include an octal socket 510 and an electrically actuated clutch 511 and an electrically actuated brake 512 for the control of which is provided a relay R7 and a time delay relay R7TD. These elements are associated with switches 374 and 376, previously described. The switch 374 is normally closed but acts as a holding switch for the relay R7 after the same has been energized by the momentary closing of the normally open switch 376. As before noted, an operating cycle of the loaded bag conveyor 28 is initiated by the momentary closing of switch 376 by the initial leftward movement of carriage 227 from the position in which it is shown in FIG. 10 at the start of a bag replenishing cycle by the automatic bagger 27 of the invention. Prior to the initiation of a travel cycle of the loaded bag conveyor, the clutch 511 is de-energized and the brake 512 is energized by a flow of direct current delivered to the latter from the octal socket 510. The geared motor 365 is normally operating continuously. With the energizing of relay R7 by the momentary closing of switch 376, the normally closed switch 374 forms a holding circuit which continues to energize relay R7 until switch 374 is momentarily opened. Upon the energizing of relay R7, the time delay relay R7TD is, after a certain adjusted time lag, caused to function to de-energize brake 512 and energize clutch 511. This starts conveyors 361 and 362 to travel the distance of one of the bag pockets 364, at the conclusion of which travel, a divider 363 momentarily opens switch 374 which de-energizes relay R7 and immediately restores the normal status of time unit relay R7TD to that shown in FIG. 19 and which throws out clutch 511 and applies brake 512 thereby instantly halting the conveyors 361 and 362 of the loaded bag conveyor 28.

Each cycle of operation of the loaded conveyor 28 above described advances this so as to remove a loaded bag just filled by the bagger 27 from under the scoop 194 and positioning the next pocket 364 in said conveyor beneath the scoop and in vertical alignment therewith in readiness to receive the next loaded bag deposited on the conveyor by said scoop. In this manner the pockets 364 of the conveyor 28 are successively filled with loaded bags 333 which progressively move from the left end of the conveyor 28 toward the right end thereof as this is viewed in FIG. 21. Each of these bags is preferably closed by the application of a closure to the open neck thereof while said bag is travelling on conveyor 28 or during the intervals in said travel. This may be done by hand with pieces of wire or can be effected mechanically by any of many different types of closing machines available on the market. The closure applying device 371 illustrated in FIGS. 21 and 22 is a Kwik Lok bag closing machine which automatically receives the loose open necks of the bags at the upper ends thereof, gathers the open neck of each bag together and applies a closure thereto.

What is claimed is:

1. An automatic bagging machine comprising:
    means for supporting horizontally a stack of flexible plastic bags and successively inflating said bags one at a time from the top of said stack;
    a scoop having open upper and lower ends to permit a loose product to gravitate downwardly therethrough into a bag;

means on the lower end of said scoop which is expansible within the open mouth of an inflated bag to temporarily attach said bag to said scoop;

carriage means, on which said scoop is pivotally mounted on a horizontal axis, for automatically reciprocating said scoop along a horizontal path at a right angle with said axis and on the same level as said inflated bags, said path extending between said bag stack support and a bag filling station;

means for rotating said scoop into horizontal alignment with an inflated bag as said scoop approaches the latter whereby said expansible means is inserted into said bag;

means responsive to the extension of said expansible means into said bag to expand the same to attach the bag to said scoop;

means for rotating said scoop about said axis into a steeply inclined position during the return of said scoop to said bagging station, after said scoop has picked up said bag, for delivering a product by gravity through said scoop and into said bag; and means, functioning coordinately with the delivery of said product into said bag, to retract said expansible means to release said loaded bag from said scoop and and initiate another horizontal reciprocation of said scoop with said carriage means.

2. An automatic bagginug machine as recited in claim 1 wherein is provided:

a conveyor having an endless series of loaded bag receiving pockets said conveyor being positioned with one of its pockets located directly beneath said bag filling station; and means responsive to the releasing of a filled bag with the latter resting in said conveyor pocket to start said conveyor and cause it to stop when it has travelled to bring an empty pocket into place beneath said bag filling station.

3. An automatic bagging machine as recited in claim 1 wherein there is provided:

an automatic batch weigher; and means responsive to a batch of a given minimum weight being received by said weigher, to deliver said batch into said scoop.

4. An automatic bagging machine as recited in claim 3 wherein there is provided:

means in said batch weigher for receiving onto the scales platform thereof another batch to be weighed, while the immediately previously weighed batch is being discharged from said platform into said scoop; and means for keeping said batches segregated while both occupy said platform.

5. An automatic bagging machine as recited in claim 3 wherein there is provided:

means responsive to the absence of a bag on said scoop when the latter returns to said bag filling station, to prevent the delivery of a weighed batch to said scoop until said scoop has been furnished with a bag.

6. An automatic bagging machine as recited in claim 5 wherein manually controlled electrical means is provided for recycling said scoop to supply the latter with a bag when the automatic means for supplying said scoop with a bag has failed.

7. An automatic bagging machine as recited in claim 6 wherein said automatic batch weigher control means automatically causes the discharge of a weighed batch into said scoop upon the successful manually controlled recycling of said scoop.

8. A batch weigher comprising:

a balanced scales platform structure;

an endless belt sloping downwardly from its receiving end to its discharge end;

driven and idle pulleys rotatably mounted on said structure said belt being trained about said pulleys;

finger means provided on said belt to extend outwardly therefrom at two points spaced apart in opposite directions by one-half the length of said belt;

sidewalls on said structure for retaining, on said belt, material supported by the latter;

means for transmitting power to said driven pulley for driving said belt one-half its length at a time and then halting said belt for a weighing cycle, one of said finger means extending upwardly from said belt at its discharge end and the other of said finger means extending downwardly from said belt at its receiving end whenever said belt is halted; and weight sensor means causing said power transmitting means to respond to the delivery of a predetermined weight of material onto said belt to drive said belt a one-half revolution as aforesaid, said power transmitting means being substantially separated gravitationally from said scales platform structure during a weighing cycle so as not to interfere with the performance of said weight sensor means in evaluating the weight of material delivered on said belt.

9. A batch weigher as excited in claim 8 wherein is provided:

means for automatically feeding said material onto the receiving end of said belt; said means being responsive to said weight sensor means to halt said feeding, upon said predetermined weight of material having been fed onto said belt; and means responsive to the travel by said belt in starting to discharge said batch of material, to cause said feed means to resume feeding said material onto the receiving end of said belt while said discharging of a weighed batch is taking place.

10. A batch weigher as recited in claim 8 wherein the means for halting said belt on concluding its travelling one-half its length includes an electric switch actuated by one of said finger means.

11. A batch weigher as recited in claim 8 wherein is provided:

a bag scoop supported for receiving in its upper end a batch of material discharged from said belt and delivering said material by gravity into the open upper end of a flexible bag;

means for holding said bag with its upper end surrounding the lower end of said scoop; and means responsive to the completion of the travel of said belt one-half its length to release said loaded bag, and replace said loaded bag on said scoop with an empty bag.

12. A batch weigher as recited in claim 8 wherein time delay electrical relay means with a short delay period is interposed between said weight sensor means and said power transmitting means and the latter is not activated to discharge a batch if said sensor means recovers from the first bobble within said short period; and wherein time delay electrical relay means with a longer delay period is interposed between said weight sensor means and said power transmitting means during subsequent bobbles to assure a minimum weight in the batch when the sensor means fails to recover during said longer delay period.

13. A batch weigher as recited in claim 8 wherein said power transmitting means includes a solenoid actuated clutch for connecting said means to said driven pulley;

means responsive to said weight sensor means causing said solenoid actuated clutch to be engaged whereby said power transmitting means rotates said driven pulley to discharge a weighed batch of material from said belt; and means responsive to the conclusion of said belt travelling one-half its length to open said solenoid actuated clutch and halt said belt, the opening of said solenoid actuated clutch completely breaking gravitational connection between said power means and said balanced scales platform structure.

14. A batch weigher as recited in claim 13 wherein said clutch comprises:
  a driven roller coaxially mounted on a common shaft with said driven pulley;
  a drive roller;
  means for mounting said drive roller radially aligned and in spaced relation with said driven roller; and
  means for power rotating said drive roller with the latter adapted to be shifted in and out of contact with said driven roller.

References Cited
UNITED STATES PATENTS

| | | | |
|---|---|---|---|
| 2,536,516 | 1/1951 | Peterson | 53—59 |
| 3,399,507 | 9/1968 | Litchard | 53—59 |

TRAVIS S. McGEHEE, Primary Examiner

U.S. Cl. X.R.

53—188; 177—120; 198—39